United States Patent
Shin

(10) Patent No.: US 7,935,440 B2
(45) Date of Patent: May 3, 2011

(54) SECONDARY BATTERY HAVING ANODE TAB OF PIN TYPE

(75) Inventor: Jeong-Soon Shin, Cheonan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1121 days.

(21) Appl. No.: 10/870,770

(22) Filed: Jun. 17, 2004

(65) Prior Publication Data

US 2004/0258987 A1    Dec. 23, 2004

(30) Foreign Application Priority Data

Jun. 19, 2003    (KR) .................. 10-2003-0039960

(51) Int. Cl.
*H01M 2/00* (2006.01)
(52) U.S. Cl. ...................................................... 429/163
(58) Field of Classification Search .................. 429/94, 429/161, 163, 164, 211
See application file for complete search history.

(56) References Cited

U.S. PATENT DOCUMENTS

| 5,747,188 A * | 5/1998 | Von Sacken et al. ........... 429/61 |
| 6,869,725 B2 * | 3/2005 | Iwanaga et al. ............... 429/130 |
| 2002/0106554 A1 * | 8/2002 | Nemoto et al. ................. 429/72 |

FOREIGN PATENT DOCUMENTS

JP    6-290769    10/1994

OTHER PUBLICATIONS

Patent abstracts of Japan for publication No. 06-290769 dated Oct. 18, 1994 in the name of Fumiaki Murakami et al.

* cited by examiner

*Primary Examiner* — Patrick Ryan
*Assistant Examiner* — Muhammad Siddiquee
(74) *Attorney, Agent, or Firm* — Christie, Parker & Hale, LLP

(57) ABSTRACT

A secondary battery includes an electrode assembly where a negative plate and a positive plate are arranged by interposing a separator therebetween, and a can mounting the electrode assembly therein. A cap assembly is fitted to the can to tightly seal the can, and is electrically connected to the positive plate. A pin is inserted into the electrode assembly, and it contacts the negative plate and the can to electrically interconnect the negative plate and the can.

12 Claims, 4 Drawing Sheets

SECONDARY BATTERY HAVING ANODE TAB OF PIN TYPE

CROSS-REFERENCE TO RELATED APPLICATION

This application claims priority to and benefit of Korean Patent Application No. 2003-39960 filed on Jun. 19, 2003 in the Korean Intellectual Property Office, the disclosure of which is incorporated herein by reference.

BACKGROUND (a) Field of the Invention

The present invention relates to a secondary battery, and in particular, to an anode tab for a negative plate of an electrode group.

(b) Description of Related Art

Generally, batteries are largely classified into a secondary battery which can be repeatedly charged and discharged, and a primary battery which is not rechargeable, and is disposed of after it becomes depleted. Batteries are formed with various shapes, such as a cylindrical shape, a prismatic shape, and a pouch shape, depending upon the profile of the target appliances.

Among them, the cylindrical-shaped secondary battery has an electrode assembly where a negative plate and a positive plate are rolled in the form of a jelly-roll while interposing a separator therebetween, a cylindrical can mounting the electrode assembly therein, and a cap assembly fitted to the top of the can.

An insulating plate is disposed between the electrode assembly and the cap assembly as well as between the electrode assembly and the can.

The positive plate of the electrode assembly is electrically connected to the cap assembly via a cathode tab, and the negative plate of the electrode assembly is electrically connected to the can via an anode tab.

The anode tab is mainly formed with a nickel strip having a thickness of 0.05-0.1 mm, and it is welded to the negative plate located at the outermost area of the electrode assembly and the inner bottom surface of the can to electrically interconnect the negative plate and the can.

However, as the nickel strip used as the anode tab is rigid, when the electrode assembly welded with the anode tab is inserted into the can, the anode tab is liable to be stuck at the opening portion of the can, thereby incurring an abnormality in the arrangement of the electrode assembly In this connection, the outer diameter of the electrode assembly is designed such that when the electrode assembly is inserted into the can, a margin (for instance, of 0.2-0.4 mm) is allowed between them. However, this makes the electrode assembly limited in its dimensions, and hence, the electrode assembly cannot be enlarged within the can enough to heighten the battery capacity.

SUMMARY

According to one embodiment of the invention, the secondary battery includes an electrode assembly where a negative plate and a positive plate are arranged by interposing a separator therebetween, and a can mounting the electrode assembly therein. A cap assembly is fitted to the can to tightly seal the can, and is electrically connected to the positive plate. A pin is inserted into the electrode assembly, and it contacts the negative plate and the can to electrically interconnect them.

The pin is formed with a hollowed shape in one embodiment, protrusions are formed at one side end portion of the pin, and the protrusions are welded to the can. In the embodiment, the protrusions are inclined toward the center of the pin.

A plurality of the protrusions are provided in another embodiment of the invention, and communication holes are arranged between the protrusions to communicate the interior of the pin with the exterior thereof.

In one embodiment, the pin comprises nickel or nickel alloy.

In another embodiment, the electrode assembly is substantially in the shape of a jelly-roll, and the pin is inserted into the center of the electrode assembly.

BRIEF DESCRIPTION OF THE DRAWINGS

The above and other advantages of the present invention will become more apparent by describing exemplary embodiments thereof in detail with reference to the accompanying drawings in which.

DETAILED DESCRIPTION OF EXEMPLARY EMBODIMENTS

The present invention will be described more fully hereinafter with reference to the accompanying drawings, in which exemplary embodiments of the invention are shown.

Figure 1:
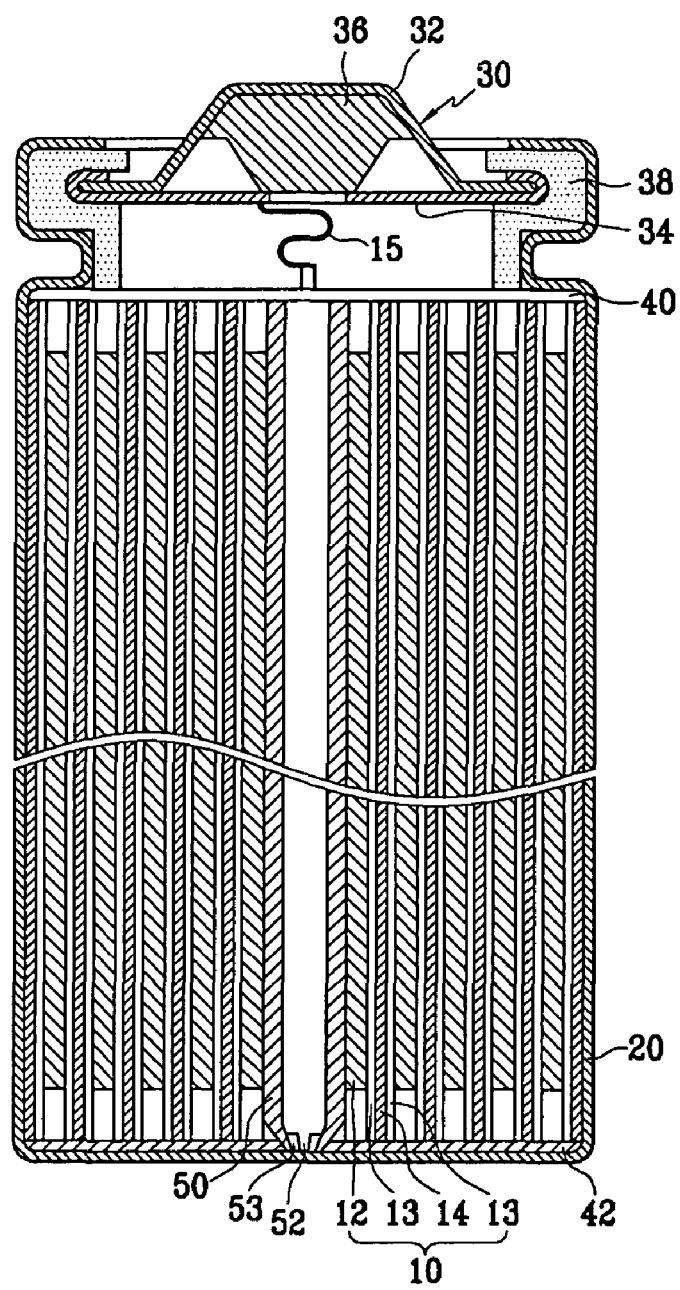
FIG. 1 is a sectional view of a secondary battery according to an embodiment of the present invention.
Figure 2:
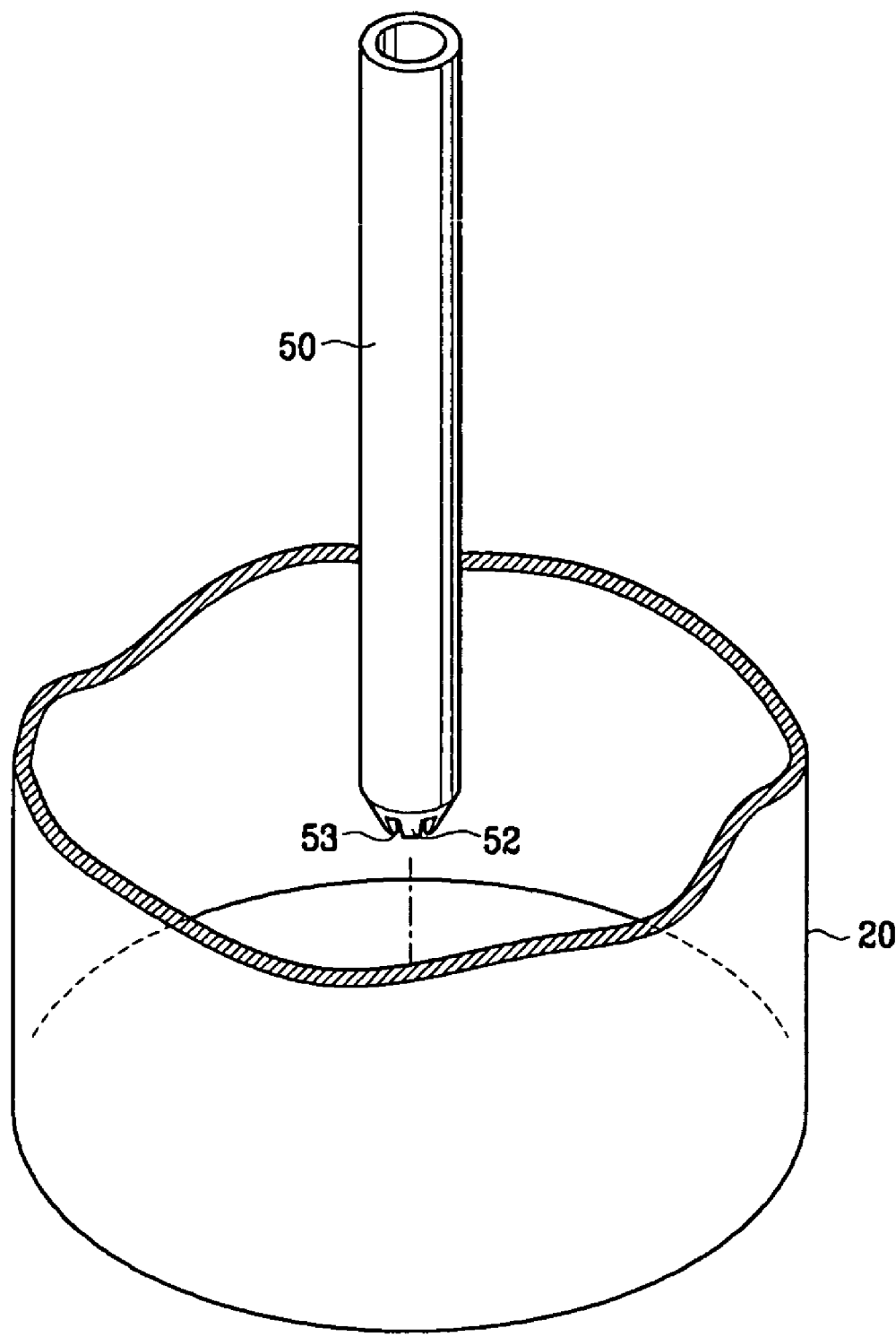
FIG. 2 illustrates the structure of a pin according to the embodiment of the present invention.
Figure 3:
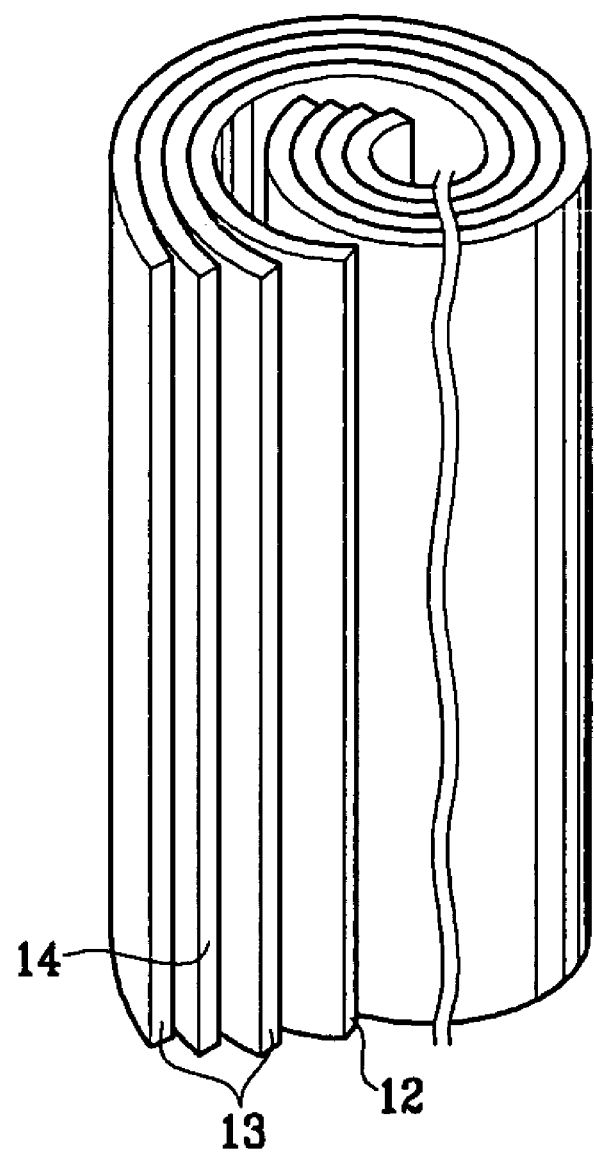
FIG. 3 is a schematic perspective view of an electrode assembly for the secondary battery according to the embodiment of the present invention.

As shown in FIGS. 1 to 3, the secondary battery has an electrode assembly 10 where a negative plate 12 and a positive plate 14 are rolled in the form of a jelly-roll while interposing a separator 13 therebetween, a cylindrical can 20 mounting the electrode assembly 10 therein and being electrically connected to the negative plate 12 of the electrode assembly 10, a cap assembly 30 fitted to the top of the can 20 and being electrically connected to the positive plate 14 of the electrode assembly 10, and a pin 50 inserted into the center of the electrode assembly 10 while contacting the negative plate 12 and being partially welded to the bottom surface of the can 20 to electrically interconnect the negative plate 12 of the electrode assembly 10 and the can 20.

Figure 4:
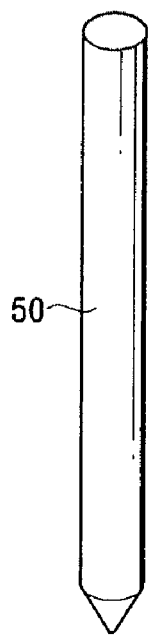
FIG. 4 illustrates another embodiment of a pin according to the present invention.

The pin 50 can be formed with a hollowed shape for obtaining a passageway for gas. Alternatively, as shown in FIG. 4, the pin 50 may be formed with a solid bar shape.

Figure 5:
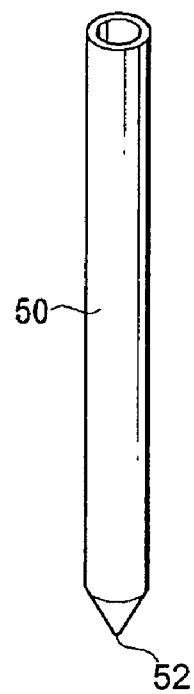
FIG. 5 illustrates yet another embodiment of a pin according to the present invention.

A plurality of communication holes 53 are formed at the bottom end portion of the pin 50 to communicate the interior of the pin 50 with the exterior thereof and obtain the passageway for gas and electrolyte, but the formation thereof is not necessary (as shown in FIG. 5).

A plurality of protrusions 52 are formed at the bottom end portion of the pin 50 between the neighboring communication holes 53 while defining those holes.

The protrusions 52 are welded to the can 20 while contacting the bottom surface thereof, and are inclined toward the center of the pin 50. This structure makes it easy to weld the protrusions 52 to the bottom surface of the can 20 at one point.

Alternatively, as shown in FIG. 5, only one protrusion 52 may be formed at the bottom end portion of the pin 50 without forming the holes 53.

Meanwhile, the pin 50 is formed with nickel or nickel alloy, which involves excellent conductivity and excellent weldability with respect to the can 20.

As shown in FIG. 3, with the electrode assembly 10, the negative plate 12, the separator 13, the positive plate 14, and the separator 13 are sequentially tired from the interior of the assembly to the exterior thereof, and rolled in the form of a jelly-roll.

Consequently, the negative plate 12 is exposed at the interior of the electrode assembly 10, and is closely adhered to the pin 50 mounted within the electrode assembly 10 to make an electrical connection thereto.

The cap assembly 30 has a cap 32 and a cap cover 34 fitted to the can 20 by interposing a gasket 38 therebetween. A rubber vent 36 is provided between the cap 32 and the cap cover 34.

A cathode lead 15 connected to the positive plate 14 of the electrode assembly 10 is connected to the cap cover 34 of the cap assembly 30.

An upper insulating plate 40 is installed between the cap assembly 30 and the electrode assembly 10, and a lower insulating plate 42 is installed between the bottom surface of the can 20 and the electrode assembly 10.

The cap assembly 30, the electrode assembly 10, and the can 20 may be constructed using the structure of a common lithium ion battery, and hence, detailed explanation thereof will be omitted.

With the above-structured secondary battery, an anode tab is not installed at the exterior of the electrode assembly, and hence, it is possible to form the electrode assembly with an outer diameter corresponding to the inner diameter of the can.

Accordingly, with the inventive secondary battery, when the outer diameter of the electrode assembly is 17.10-17.20 mm, it is possible to enlarge the outer diameter of the electrode assembly by 0.5-1.0% compared to the conventional one, and hence, to increase the battery capacity by 2-5%.

Furthermore, as the anode tab is not installed at the exterior of the electrode assembly, the anode tab is prevented from being stuck on the can during the process of inserting the electrode assembly into the can, and hence, the assembling operation is performed in a very fluent manner.

With the conventional case, as the center portion of the electrode assembly is vacant with a weak strength, it is liable to be distorted under the application of external impact. By contrast, with the inventive secondary battery, a pin is provided at the center of the electrode assembly, and it absorbs the force of an external impact, thereby preventing the electrode assembly from being distorted.

Furthermore, with the conventional case, when the electrode assembly is tested within a hot oven at 150° C. or more, the inner structure thereof is distorted so that the gas internally generated is not easily discharged through the safety vent provided at the bottom of the can, and is liable to explode. By contrast, with one embodiment of the inventive secondary battery, as the passageway of gas is fluently made through the pin, the gas that is internally generated is well discharged through the safety vent, thereby preventing the battery explosion, and satisfying safety concerns.

The secondary battery according to the embodiment of the present invention may be formed with a cylindrical shape, a prismatic shape, or other shapes.

Although exemplary embodiments of the present invention have been described in detail hereinabove, it should be clearly understood that many variations and/or modifications of the basic inventive concept herein taught which may appear to those skilled in the art will still fall within the spirit and scope of the present invention, as defined in the appended claims.

What is claimed is:

1. A secondary battery comprising:
    an electrode assembly comprising a negative plate, a positive plate, and a separator between the negative plate and the positive plate;
    a can mounting the electrode assembly therein;
    a cap assembly fitted to the can to tightly seal the can, and electrically connected to the positive plate; and
    a pin having a substantially cylindrical shape with a narrowing at only one end, the pin comprising a continuous solid wall and a plurality of separate protrusions at the only one end, the protrusions inclined toward the center of the pin, the pin inserted into the electrode assembly as an anode tab and contacting the negative plate and the can to electrically interconnect the negative plate and the can as the anode tab,
    wherein the plurality of separate protrusions are welded to a welding portion of the can, and
    wherein the welding portion of the can is flat.

2. The secondary battery of claim 1, wherein the pin is substantially hollow.

3. The secondary battery of claim 2, further comprising communication holes arranged between the protrusions to communicate the interior of the pin with the exterior thereof.

4. The secondary battery of claim 1, wherein the pin comprises at least one of nickel and nickel alloy.

5. The secondary battery of claim 1, wherein the electrode assembly is substantially in the shape of a jelly-roll, and the pin is located in the center of the electrode assembly.

6. The secondary battery of claim 1, wherein the shape of the can is substantially cylindrical.

7. The secondary battery of claim 1, further comprising a cathode lead electrically connected to the positive plate.

8. The secondary battery of claim 1, further comprising an insulating plate between the cap assembly and the electrode assembly, and the pin further comprising a second end, the second end being in contact with the insulating plate.

9. The secondary battery of claim 1, wherein the plurality of separate protrusions are welded to a bottom surface of the can.

10. A secondary battery comprising:
    an electrode assembly comprising a negative plate, a positive plate, and a separator between the negative plate and the positive plate;
    a can mounting the electrode assembly therein;
    a cap assembly fitted to the can to tightly seal the can, and electrically connected to the positive plate; and
    a pin having a substantially cylindrical shape with a narrowing at only one end, the pin comprising a continuous solid wall and a protrusion at the only one end, the protrusion inclined toward the center of the pin, the pin inserted into the electrode assembly as an anode tab and contacting the negative plate and the can to electrically interconnect the negative plate and the can as the anode tab,
    wherein the protrusion is welded to a welding portion of the can, and
    wherein the welding portion of the can is flat.

11. The secondary battery of claim 10, wherein the pin is substantially a hollow cylinder.

12. The secondary battery of claim 10, wherein the pin is substantially a solid cylinder.

* * * * *